(12) United States Patent
Kitano et al.

(10) Patent No.: US 11,500,141 B2
(45) Date of Patent: Nov. 15, 2022

(54) OPTICAL FIBER MODULE, LIGHTING DEVICE, AND METHOD OF MANUFACTURING OPTICAL FIBER MODULE

(71) Applicant: Panasonic Intellectual Property Management Co., Ltd., Osaka (JP)

(72) Inventors: Hiroshi Kitano, Hyogo (JP); Yoshiyuki Takahira, Kyoto (JP); Hideharu Kawachi, Hyogo (JP); Shinichi Kitaoka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 157 days.

(21) Appl. No.: 17/000,764

(22) Filed: Aug. 24, 2020

(65) Prior Publication Data

US 2021/0063626 A1    Mar. 4, 2021

(30) Foreign Application Priority Data

Aug. 29, 2019   (JP) .............................. JP2019-156468

(51) Int. Cl.
*F21V 8/00* (2006.01)
*G02B 6/38* (2006.01)
*H01S 3/067* (2006.01)

(52) U.S. Cl.
CPC ......... *G02B 6/0008* (2013.01); *G02B 6/3861* (2013.01); *H01S 3/067* (2013.01)

(58) Field of Classification Search
CPC ................................................... G02B 6/0006
See application file for complete search history.

(56) References Cited

U.S. PATENT DOCUMENTS

| | | | |
|---|---|---|---|
| 2003/0105246 A1* | 6/2003 | Andoh | C08F 283/12 525/474 |
| 2006/0039658 A1 | 2/2006 | Furuyama et al. | |
| 2007/0092184 A1* | 4/2007 | Hama | G02B 6/4298 385/47 |
| 2014/0015413 A1 | 1/2014 | Ito et al. | |
| 2019/0097722 A1* | 3/2019 | McLaurin | H04B 10/502 |

FOREIGN PATENT DOCUMENTS

| | | |
|---|---|---|
| EP | 3 511 377 A1 | 7/2019 |
| JP | S57-125915 A | 8/1982 |
| JP | 2705830 B2 | 10/1997 |

(Continued)

OTHER PUBLICATIONS

Polysilsesquioxane [Recherchiert am Sep. 12, 2021] Im Internet: <URL: http://konishi-chem.co.jp/en/development/psq>.

(Continued)

*Primary Examiner* — Joseph L Williams
(74) *Attorney, Agent, or Firm* — Greenblum & Bernstein, P.L.C.

(57) ABSTRACT

An optical fiber module includes an optical fiber containing a glass component, and a ferrule which is tubular in shape and covers an outer circumferential surface in an end portion of the optical fiber. The outer circumferential surface of the optical fiber and an inner circumferential surface of the ferrule are bonded by a silicone resin containing siloxane bonds at cross-linking points.

9 Claims, 10 Drawing Sheets

(56) References Cited

FOREIGN PATENT DOCUMENTS

| JP | 2000-231029 A | 8/2000 |
|---|---|---|
| JP | 2006-059867 A | 3/2006 |
| JP | 2007-072225 A | 3/2007 |
| JP | 2013-125195 A | 6/2013 |
| JP | 6423500 B2 | 11/2018 |

OTHER PUBLICATIONS

Office Action, dated Dec. 15, 2021, in the corresponding German Patent Application No. 102020122217.3.

* cited by examiner

OPTICAL FIBER MODULE, LIGHTING DEVICE, AND METHOD OF MANUFACTURING OPTICAL FIBER MODULE

CROSS REFERENCE TO RELATED APPLICATION

This application claims the benefit of priority of Japanese Patent Application Number 2019-156468, filed on Aug. 29, 2019, the entire content of which is hereby incorporated by reference.

TECHNICAL FIELD

The present disclosure relates to an optical fiber module including an optical fiber, a lighting device including the optical fiber module, and a method of manufacturing an optical fiber module.

BACKGROUND ART

Conventionally, optical fiber modules including an optical fiber which guides laser light output from a light source element are known. As one example of an optical fiber module of this type, Japanese Unexamined Patent Application Publication No. 2013-125195 (PTL 1) discloses an optical fiber module including an optical fiber and a tubular ferrule into which an end portion of the optical fiber is inserted. PTL 1 discloses fixation of the optical fiber inside the ferrule using an epoxy adhesive.

SUMMARY

In the optical fiber module, laser light is introduced into an optical fiber by irradiating an end surface of the optical fiber with the laser light output from a light source element. During the irradiation of the end surface of the optical fiber with laser light, the epoxy adhesive by which the optical fiber and the ferrule are bonded may also be irradiated with laser light in some cases. There is a problem that the epoxy adhesive, if irradiated with laser light, emits light. There is another problem that if the epoxy adhesive emits light, precision in detection of the presence/absence of disconnection of the optical fiber is reduced in the lighting device including the optical fiber module.

Accordingly, an object of the present disclosure is to provide an optical fiber module or the like which can suppress light emission of an adhesive by which an optical fiber and a ferrule are bonded.

The optical fiber module according to one aspect of the present disclosure includes an optical fiber containing a glass component; and a ferrule which is tubular in shape and covers an outer circumferential surface in an end portion of the optical fiber. The outer circumferential surface of the optical fiber and an inner circumferential surface of the ferrule are bonded by a silicone resin containing siloxane bonds at cross-linking points.

The lighting device according to one aspect of the present disclosure includes a light source element which outputs laser light; the optical fiber module according to any one of claims 1 to 4 into which the laser light is introduced; and a wavelength converter which converts the laser light guided by the optical fiber module into light having a different wavelength.

The method of manufacturing an optical fiber module according to one aspect of the present disclosure is a method of manufacturing an optical fiber module including an optical fiber containing a glass component, and a ferrule which is tubular in shape and covers an outer circumferential surface in an end portion of the optical fiber. The method includes filling a liquid silicone resin having polymer carbons between the outer circumferential surface of the optical fiber and an inner circumferential surface of the ferrule; curing the liquid silicone resin by heating at a temperature of 140° C. or higher; and polishing an end surface of the optical fiber and an end surface of the ferrule simultaneously.

The optical fiber module and the like according to the present disclosure can suppress light emission of an adhesive by which an optical fiber and a ferrule are bonded.

BRIEF DESCRIPTION OF THE DRAWINGS

The figures depict one or more implementations in accordance with the present teaching, by way of examples only, not by way of limitations. In the figures, like reference numerals refer to the same or similar elements.

DETAILED DESCRIPTION (Underlying Knowledge Forming Basis of the Present Disclosure)

First, the underlying knowledge forming the basis of the present disclosure will be described with reference to FIGS. 1 to 6.

Figure 1:
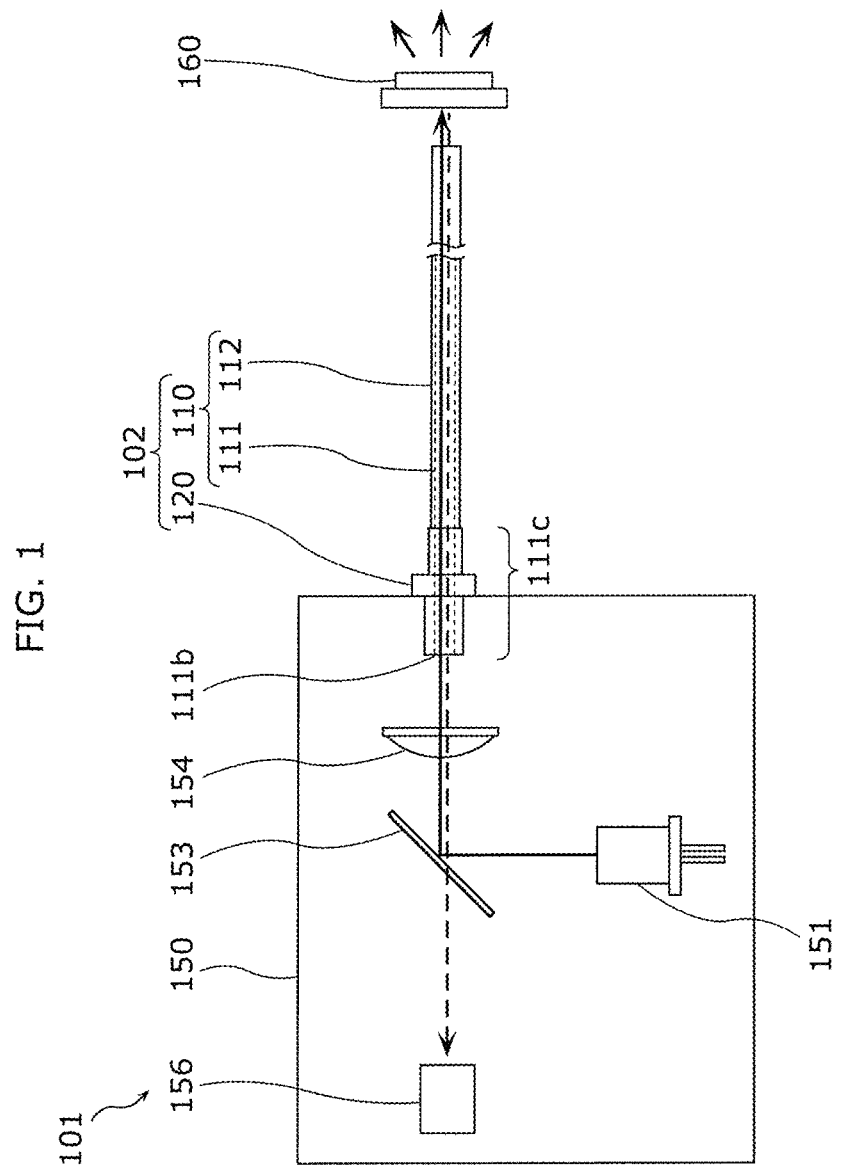
FIG. 1 is a schematic view illustrating a lighting device according to Comparative Example.

FIG. 1 is a schematic view illustrating lighting device 101 according to Comparative Example.

Lighting device 101 according to Comparative Example includes light source device 150, optical fiber module 102 including optical fiber wire 110 and ferrule 120, and wavelength converter 160. Optical fiber wire 110 is configured with optical fiber 111, and coating material 112 which covers optical fiber 111.

Light source device 150 includes light source element 151, dichroic mirror 153, combining lens 154, and optical feedback sensor 156.

The laser light output from light source element 151 is introduced into optical fiber module 102 through dichroic mirror 153 and combining lens 154. The laser light introduced into optical fiber module 102 is output through optical fiber 111 from optical fiber 111, and is input to wavelength converter 160. Wavelength converter 160 converts the input laser light into light having a different wavelength, and radiates the light.

Optical feedback sensor 156 is a sensor for detecting the presence/absence of disconnection of optical fiber 111. In the light radiated by wavelength converter 160, optical feedback sensor 156 detects optical feedback which returns via optical fiber module 102, combining lens 154, and dichroic mirror 153. In the case where this optical feedback with intensity in a predetermined range is detected, lighting device 101 determines that optical fiber 111 has no disconnection.

Figure 2:
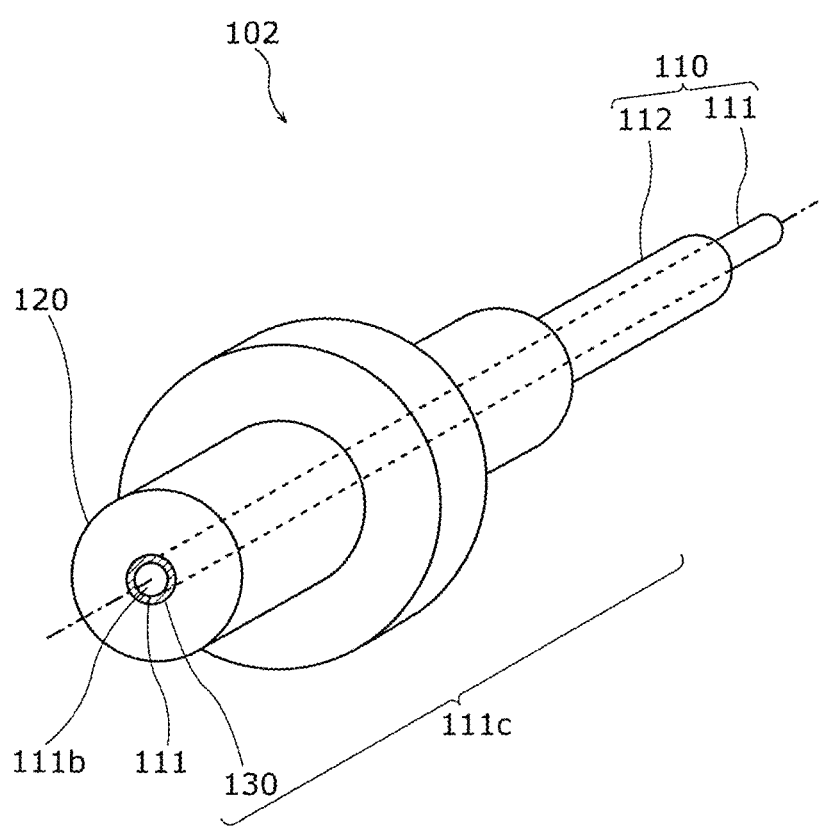
FIG. 2 is a perspective view illustrating an optical fiber module according to Comparative Example.

FIG. 2 is a perspective view illustrating optical fiber module 102 according to Comparative Example.

Optical fiber module 102 according to Comparative Example includes optical fiber 111, and ferrule 120 which is tubular in shape and covers an outer circumferential surface in end portion 111c of optical fiber 111. The outer circumferential surface of optical fiber 111 and the inner circumferential surface of ferrule 120 are bonded by epoxy adhesive 130. As described above, there is a problem that epoxy adhesive 130, if irradiated with laser light output from light source element 151, emits light.

Moreover, light emission of epoxy adhesive 130 reduces precision in detection of the presence/absence of disconnection of optical fiber 111 in lighting device 101. This will be described with reference to FIGS. 3A and 3B.

Figure 3A:
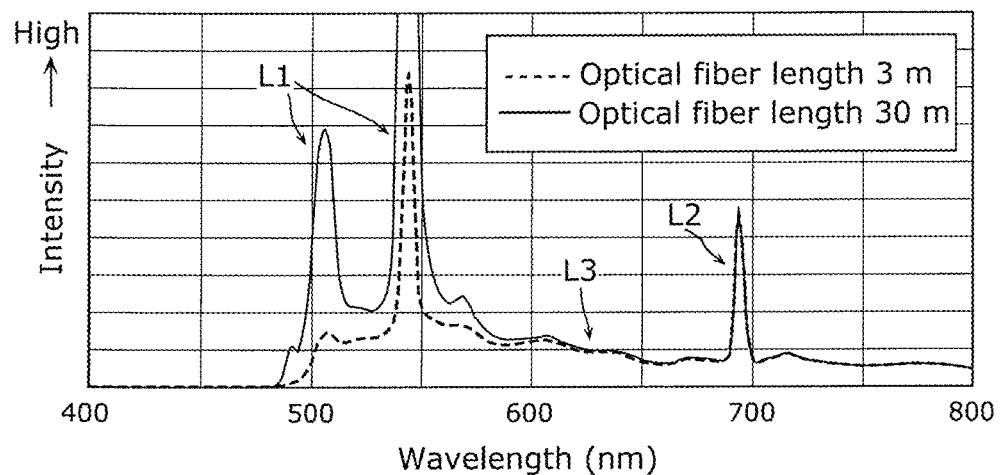
FIG. 3A is a diagram illustrating a spectrum of an optical feedback detected by an optical feedback sensor in a lighting device.

FIG. 3A is a diagram illustrating a spectrum of optical feedback detected by optical feedback sensor 156 in the lighting device. FIG. 3A illustrates the spectrum of the optical feedback when wavelength converter 160 is removed from the lighting device to create a pseudo disconnection state of optical fiber 111, rather than a state where wavelength converter 160 is mounted on the lighting device.

As illustrated in the drawing, the optical feedback contains light L1 which returns after arrival of laser light output from light source element 151 at the core of optical fiber 111 and light emission from the core, light L2 which returns after arrival of laser light output from light source element 151 at ferrule 120 and light emission from ferrule 120, and light L3 which returns after laser light output from light source element 151 at epoxy adhesive 130 present between optical fiber 111 and ferrule 120 and light emission from epoxy adhesive 130. In the spectrum of this optical feedback, light L1 returning from optical fiber 111 and light L2 returning from ferrule 120 each appear as a steep and sharp waveform while light L3 returning from epoxy adhesive 130 has low intensity across wavelengths ranging from 500 nm to 700 nm and appears as a broad waveform.

Figure 3B:
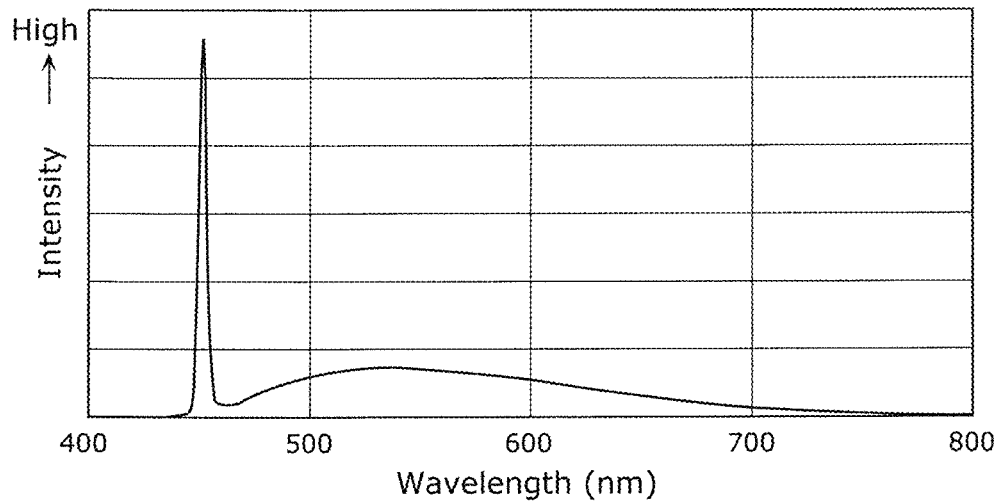
FIG. 3B is a diagram illustrating a spectrum of light emitted from an epoxy resin alone.

FIG. 3B is a diagram illustrating a spectrum of light emitted from an epoxy resin alone. As illustrated in the drawing, the spectrum of light emitted from the epoxy resin alone has a broad waveform across wavelengths ranging from 500 nm to 700 nm.

Most of laser light output from light source element 151 is emitted to end surface 111b of optical fiber 111. However, the remaining part of the laser light, which specifically corresponds to the bottom of the laser light when observed in the light intensity distribution of the laser light, is also emitted to epoxy adhesive 130 located at the outer circumference of optical fiber 111. This causes a phenomenon that epoxy adhesive 130 emits light as in the spectrum shown in FIG. 3B. The spectrum of light emitted from the epoxy resin alone shown in FIG. 3B has a region overlapping the spectrum of the light returning from wavelength converter 160 (mainly at a wavelength of 500 nm to 700 nm). This makes it difficult for optical feedback sensor 156 to detect the light emitted by epoxy adhesive 130 from the light returning from wavelength converter 160. For this reason, lighting device 101 according to Comparative Example has a problem such that the precision in detection of the presence/absence of disconnection of optical fiber 111 is reduced.

In contrast, the present inventors have verified that the light emission of the adhesive can be suppressed by using a silicone resin adhesive rather than epoxy adhesive 130.

Figure 4:
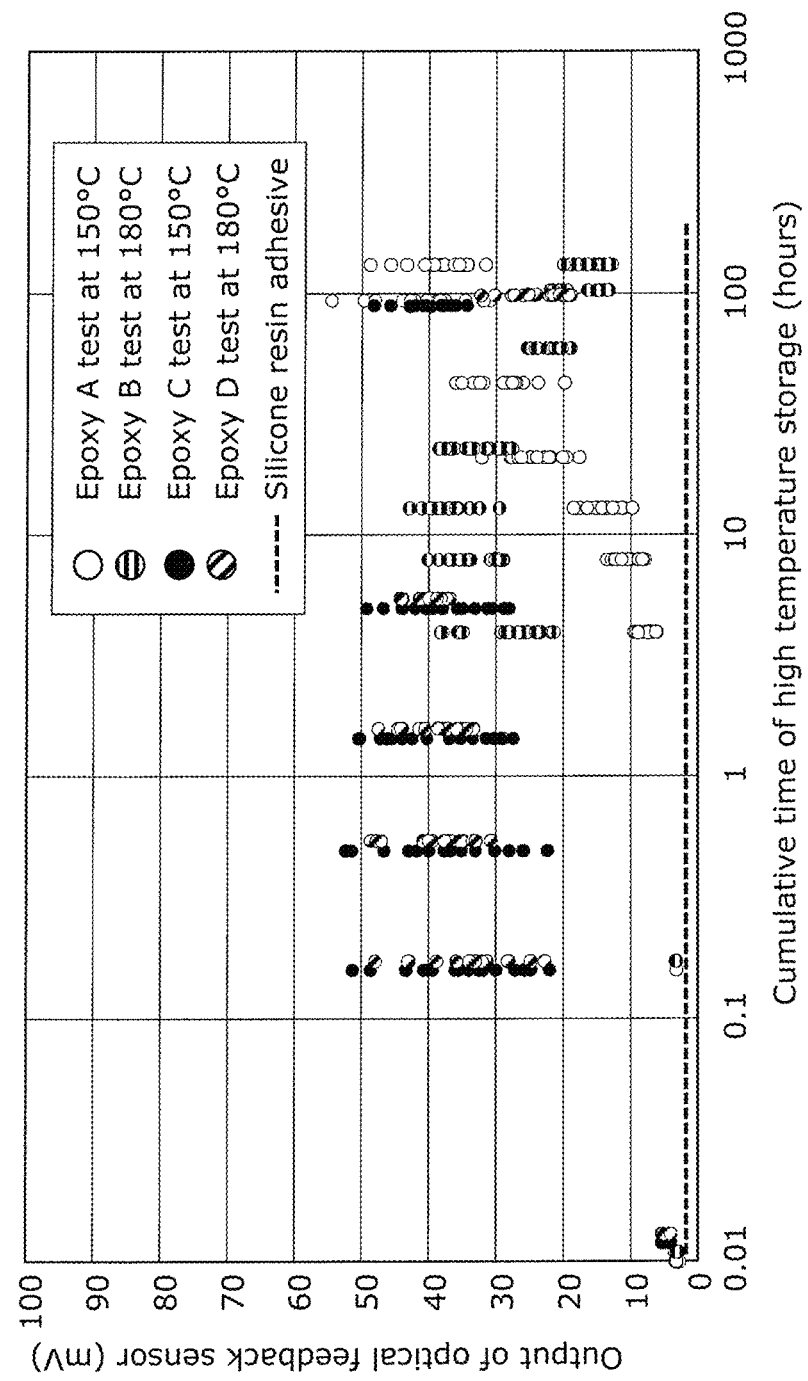
FIG. 4 is a diagram illustrating the results from a high temperature accelerated aging test performed on optical fiber modules.

FIG. 4 is a diagram illustrating the results of a high temperature accelerated aging test performed on the optical fiber module. The abscissa in FIG. 4 is the cumulative time of high temperature storage of the optical fiber module and the ordinate in FIG. 4 is the output voltage of the optical feedback sensor. In FIG. 4, the output voltage of the optical feedback sensor was measured in the state where wavelength converter 160 was removed from the lighting device, rather than in the state where wavelength converter 160 was mounted on the lighting device.

In this test, four epoxy adhesives made of epoxy resins A, B, C, and D were prepared as an adhesive by which the optical fiber and the ferrule were bonded. A 150° C. accelerated aging test was performed on the optical fiber modules including epoxy resins A and C, respectively, and a 180° C. accelerated aging test was performed on the optical fiber modules including epoxy resins B and D, respectively. A 180° C. accelerated aging test was also performed on the optical fiber module including a silicone resin adhesive.

As illustrated in FIG. 4, in the optical fiber modules including the epoxy adhesives, a longer cumulative time of high temperature storage results in a larger output voltage of the optical feedback sensor irrespective of the type of the epoxy resin. In contrast, in the optical fiber module including a silicone resin adhesive, the output voltage of the optical feedback sensor does not significantly change even if the cumulative time of high temperature storage is increased. This is because the silicone resin has higher transmissivity to laser light than that of the epoxy resin. The output voltage of the optical feedback sensor increases over time in the case of the epoxy resin because exposure of the epoxy resin under a high temperature environment progresses coloring thereof, and thus the epoxy resin has increased absorption of the laser light and increased of intensity of emission light.

As described above, where the optical fiber is bonded to the ferrule by the silicone resin, light emission of the silicone resin as the adhesive can be suppressed because the silicone resin, even when irradiated with laser light, barely absorbs the laser light. An excessive increase beyond necessity in temperature of the silicone resin as the adhesive can also be suppressed because the silicone resin barely absorbs laser light.

The present inventors have verified that strength in fixation of the optical fiber to the ferrule can be enhanced by bonding the optical fiber and the ferrule by a silicone resin containing siloxane bonds at cross-linking points among a large number of types of silicone resins.

Figure 5:
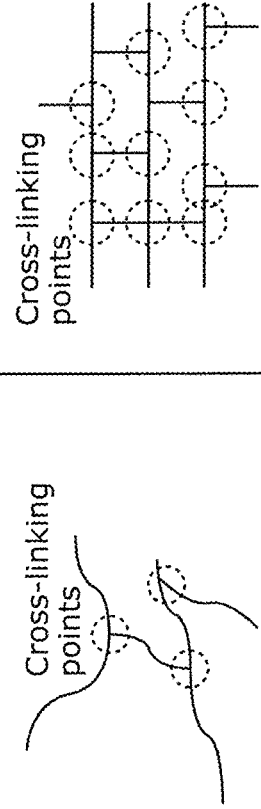
FIG. 5 is a diagram illustrating a silicone resin used as an adhesive for the optical fiber module.

FIG. 5 is a diagram illustrating a silicone resin used as an adhesive for the optical fiber module. (a) in FIG. 5 represents a comparative example, and (b) in FIG. 5 represents an example corresponding to the present disclosure.

The silicone resin according to Comparative Example has polymer carbons before a cross-linking reaction, and has carbon-carbon bonds (C—C bonds) at its cross-linking points after the cross-linking reaction. In contrast, the silicone resin according to Example has polymer carbons before the cross-linking reaction, and does not have any carbon-carbon bonds at its cross-linking points after the cross-linking reaction, and each cross-linking point is composed of a siloxane bond (Si—O—Si). In general, because the siloxane bond has higher binding energy that that of the carbon-carbon bond, the silicone resin according to Example is more heat-resistant than the silicone resin according to Comparative Example, and has higher hardness, i.e., higher mechanical strength than that of the silicone resin according to Comparative Example. Moreover, a larger number of cross-linking points per unit volume is present in the silicone resin according to Example than in Comparative Example, thus reducing the freedom of the main chains. Thus, the silicone resin according to Example has enhanced mechanical strength compared to that of the silicone resin according to Comparative Example.

Figure 6:
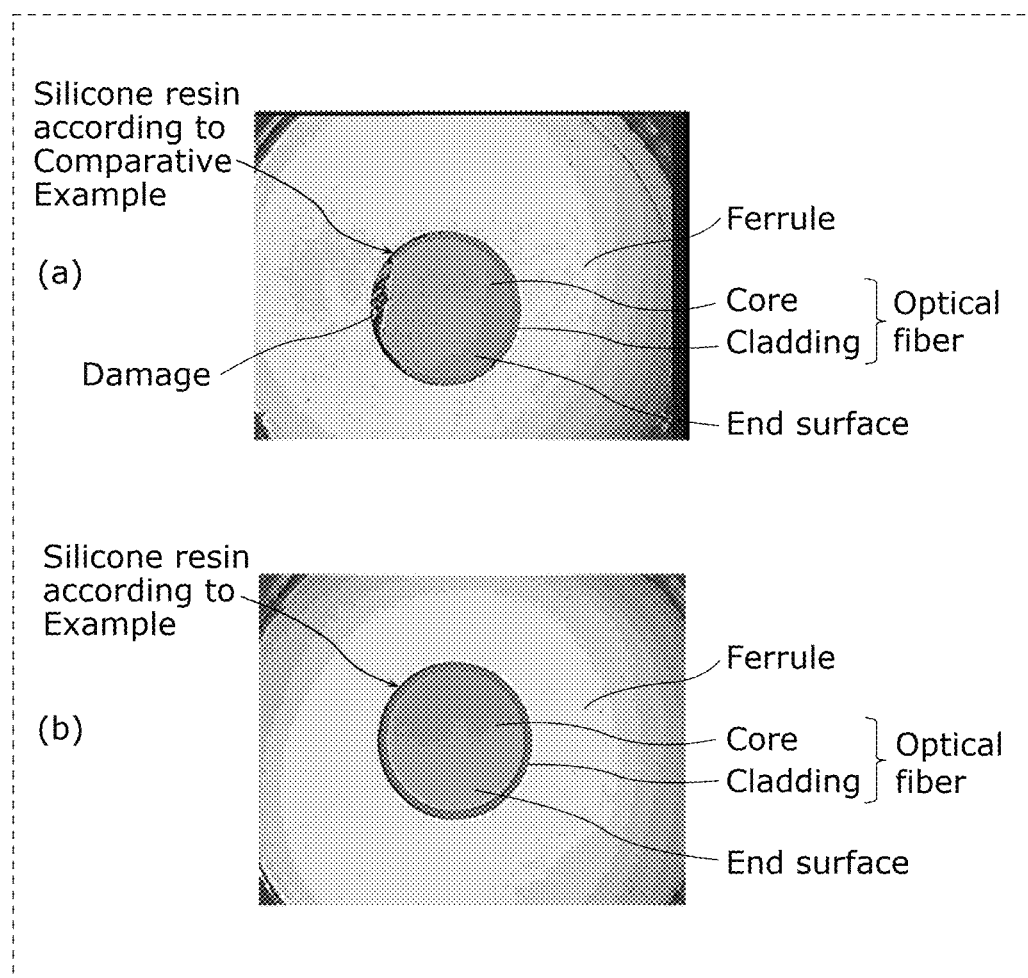
FIG. 6 is a diagram illustrating the presence/absence of damage of the end surface of the optical fiber module.

FIG. 6 is a diagram illustrating the presence/absence of damage of the end surface of the optical fiber module. (a) of FIG. 6 represents a comparative example, and (b) of FIG. 6 represents an example.

The drawing shows an image after the end surface of the optical fiber module is polished using a polisher. While the end surface of the optical fiber in Comparative Example is partially damaged, the end surface of the optical fiber in Example has no damage. It is considered that this is because the mechanical strength of the silicone resin in Example is higher than that in Comparative Example and higher strength in fixation of the optical fiber to the ferrule is provided.

Thus, a reduction in strength in fixation of the optical fiber can be suppressed by using a silicone resin containing siloxane bonds at cross-linking points as a silicone resin by which the optical fiber and the ferrule are bonded. This can suppress damage of the end surface of the optical fiber module.

Embodiments according to the present disclosure will now be described with reference to the drawings and the like. The embodiments described below all illustrate specific examples of the present disclosure. Numeral values, shapes, materials, components, arrangements, positions, and connection forms of the components, steps, order of the steps, and the like shown in the embodiments below are only examples, and will not limit the present disclosure. Among the components of the embodiments below, the components not described in an independent claim representing a form of implementation according to one embodiment of the present disclosure are described as arbitrary components. Forms of implementation of the present disclosure are not limited to current independent claims, and can be expressed by other independent claims.

The drawings are schematic views, and are not always strictly illustrated. In the drawings, identical referential numerals are given to substantially identical configurations, and the duplications of the descriptions thereof may be omitted or simplified in some cases.

EMBODIMENTS

[1. Configuration of Lighting Device]

The configuration of the lighting device according to an embodiment will be described with reference to FIG. 7.

Figure 7:
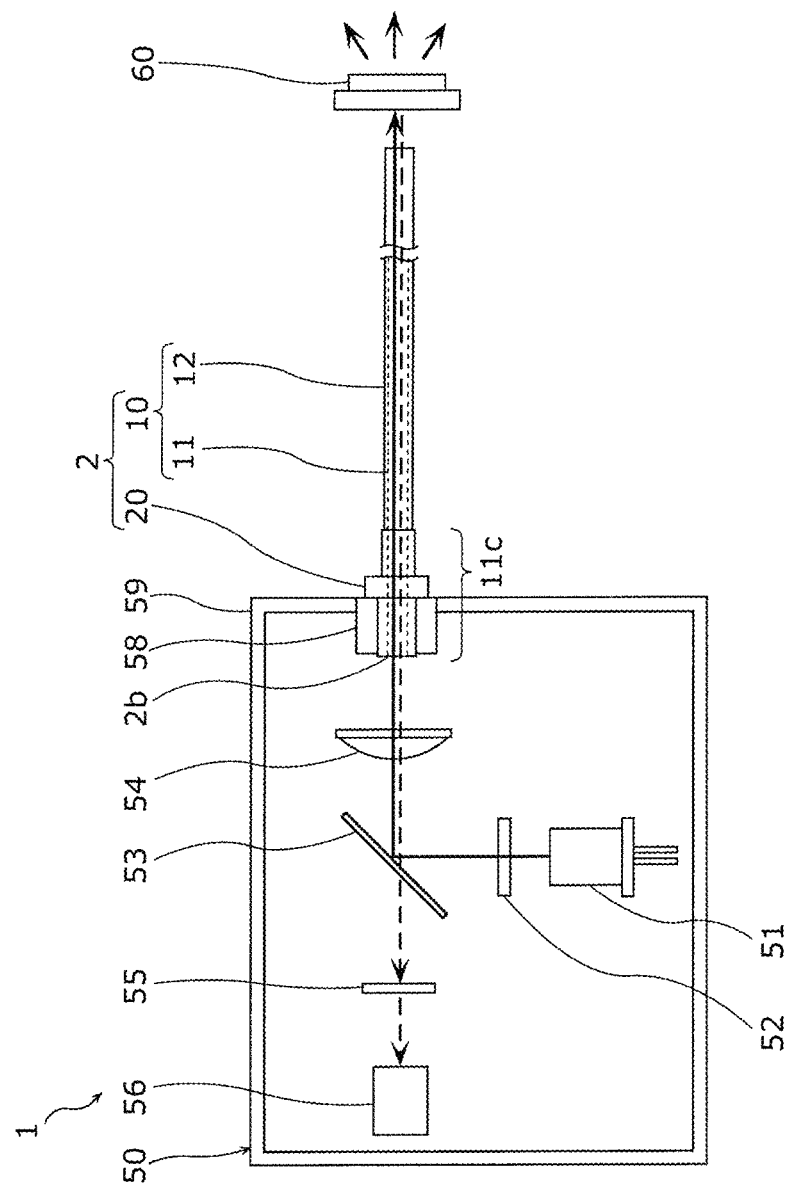
FIG. 7 is a schematic view illustrating a lighting device according to an embodiment.

FIG. 7 is a schematic view illustrating lighting device 1 according to an embodiment.

Lighting device 1 is a device which converts the wavelength of laser light and emits illumination light. As illustrated in the drawing, lighting device 1 includes light source device 50 which outputs laser light, optical fiber module 2, and wavelength converter 60.

Optical fiber module 2 is a light transmission medium which guides the laser light output from light source device 50 and outputs the laser light to wavelength converter 60. Optical fiber module 2 includes optical fiber 11 containing a glass component, and ferrule 20 which is tubular in shape and covers the outer circumferential surface in end portion 11c of optical fiber 11. Optical fiber 11 includes a core through which laser light propagates, and a cladding disposed around the core. The end portion of optical fiber module 2 includes end surface 2b irradiated with laser light output from light source device 50.

Wavelength converter 60 is a device which converts the laser light output from optical fiber module 2 into light having a different wavelength, and radiates the resulting light. Wavelength converter 60 generates fluorescence through irradiation with laser light as excitation light, and diffuses and emits light which has a plurality of wavelengths and is seen as a color of white as a whole, for example. This radiated light is emitted as illumination light.

Light source device 50 includes light source element 51, filter 52, dichroic mirror 53, combining lens 54, filter 55, and optical feedback sensor 56. Light source device 50 includes light source element 51, filter 52, dichroic mirror 53, combining lens 54, filter 55, and housing 59 in the form of a box which accommodates optical feedback sensor 56.

Receptacle 58 fitted into ferrule 20 is disposed on an outer wall of housing 59. Optical fiber module 2 is detachably attached to housing 59 through receptacle 58.

Light source element 51 is a semiconductor laser element which outputs laser light having a wavelength corresponding to blue violet to blue colors (wavelength: 430 nm or more and 490 nm or less).

Filter 52 is a bandpass filter which passes light from light source element 51 having a laser oscillation wavelength. Filter 52 passes the light having a wavelength corresponding to blue violet to blue colors out of the light output from light source element 51.

Dichroic mirror 53 is a mirror which reflects light having a specific wavelength and transmits light having a wavelength other than this wavelength. Dichroic mirror 53 reflects the light of a wavelength which has passed through filter 52, and transmits the light having a wavelength radiated by wavelength converter 60.

Combining lens 54 is a lens which introduces laser light to optical fiber module 2. Combining lens 54 is arranged between dichroic mirror 53 and optical fiber module 2. Combining lens 54 introduces the laser light to one end of optical fiber module 2 by converging the laser light reflected by dichroic mirror 53 to the end surface of optical fiber 11. The laser light introduced to optical fiber module 2 passes through optical fiber 11, is output from the other end of optical fiber 11, and is input to wavelength converter 60.

Filter 55 is a bandpass filter or longpass filter which passes light having a wavelength in a predetermined range. Out of the light having a wavelength radiated by wavelength converter 60, filter 55 passes the light returning through optical fiber module 2, combining lens 54, and dichroic mirror 53.

Optical feedback sensor 56 is a sensor for detecting the presence/absence of disconnection of optical fiber 11. In the light radiated by wavelength converter 60, optical feedback sensor 56 detects the optical feedback returning from optical fiber module 2 through filter 55. Lighting device 1 includes a processor (not illustrated) configured with a program and a CPU which executes the program, which determines that optical fiber 11 has no disconnection when the optical feedback having an intensity in a predetermined range is detected, and determines that optical fiber 11 has disconnection when the optical feedback having an intensity out of the predetermined range is detected.

According to lighting device 1, using optical fiber 11, the illumination light can be emitted to a place different from a place where light source device 50 is arranged. Because the presence/absence of disconnection of optical fiber 11 can be determined using optical feedback sensor 56, failures of lighting device 1 can be found at an early stage.

[2. Configuration of Optical Fiber Module]

Next, the configuration of optical fiber module 2 will be described with reference to FIGS. 8 and 9.

Figure 8:
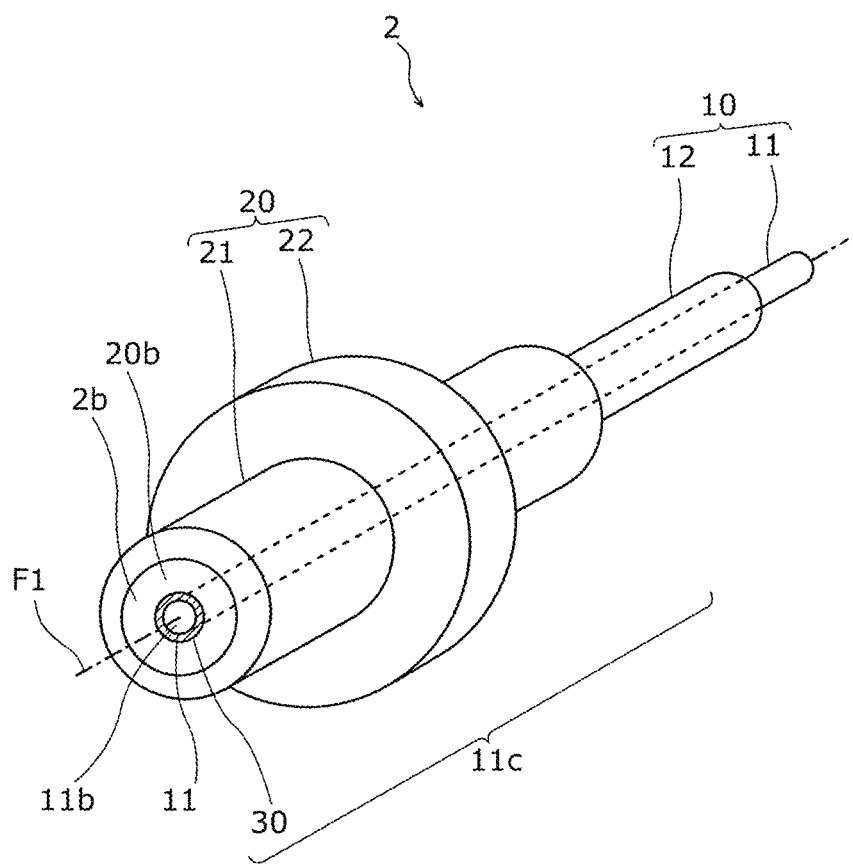
FIG. 8 is a perspective view illustrating an optical fiber module according to an embodiment.

FIG. 8 is a perspective view illustrating optical fiber module 2. FIG. 9 shows a front view and a cross-sectional view of optical fiber module 2.

Figure 9:
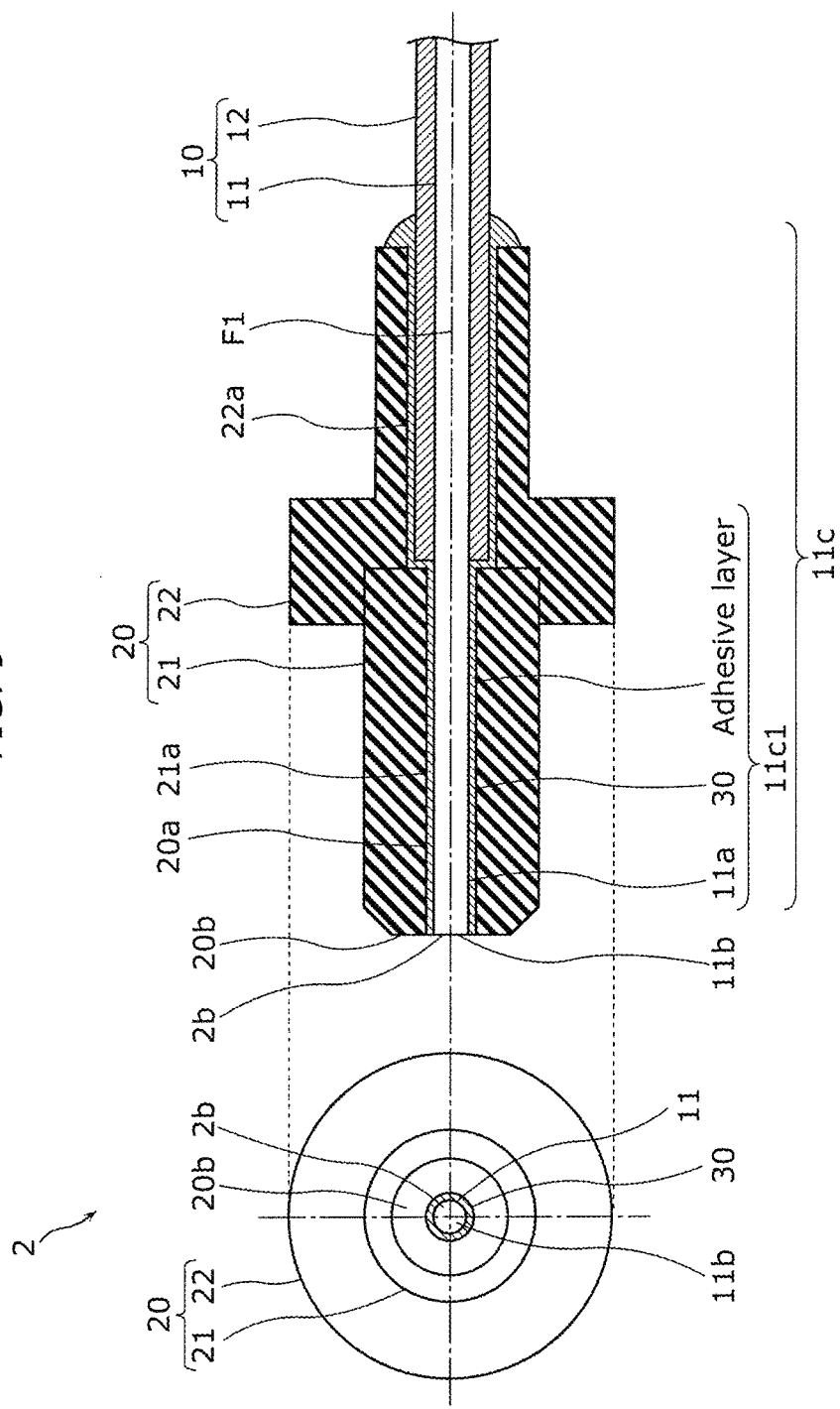
FIG. 9 is a front view and a cross-sectional view of an optical fiber module according to an embodiment.

As illustrated in FIGS. 8 and 9, optical fiber module 2 includes optical fiber wire 10 and ferrule 20 which is tubular in shape.

Optical fiber wire 10 is configured with optical fiber 11 containing a glass component, and coating material 12 which coats optical fiber 11. Optical fiber 11 has a diameter of 100 μm or more and 1000 μm or less, for example. Optical fiber 11 has a length of 1 m or more and 100 m or less, for example.

As illustrated in FIG. 9, optical fiber 11 has outer circumferential surface 11a, which is a lateral surface, and end surface 11b orthogonal to fiber axis F1 of optical fiber 11. End surface 11b forms part of end surface 2b of optical fiber module 2. In optical fiber 11, coating material 12 is removed from distal end 11c1 of end portion 11c of optical fiber 11, and outer circumferential surface 11a is exposed. End 11c of optical fiber 11 having exposed distal end 11c1 is inserted into ferrule 20. Although an example in which end surface 11b of optical fiber 11 is orthogonal to fiber axis F1 has been shown in the above description, the arrangement is not limited to this. For example, end surface 11b may be inclined to fiber axis F1 at an angle of 0° or more and 10° or less.

Ferrule 20 covers outer circumferential surface 11a in end portion 11c of optical fiber 11. Ferrule 20 has inner circumferential surface 20a, which is an inner lateral surface, and end surface 20b orthogonal to fiber axis F1. End surface 20b forms part of end surface 2b of optical fiber module 2. End surface 20b of ferrule 20 and end surface 11b of optical fiber 11 are polished surfaces which are formed simultaneously using a polisher or the like, and are flush with each other.

Ferrule 20 includes ferrule body 21, and flange 22 into which ferrule body 21 is press fitted.

Ferrule body 21 is a cylindrical member, and has through hole 21a having a diameter larger than that of optical fiber 11. Inner circumferential surface of through hole 21a forms part of inner circumferential surface 20a of ferrule 20. Distal end 11c1 of end portion 11c of optical fiber 11 is inserted into through hole 21a. Ferrule body 21 is formed with a calcined ceramic body made of zirconia, for example.

Flange 22 is a cylindrical member having a brim, and has through hole 22a having a diameter larger than that of coating material 12. The inner circumferential surface of through hole 22a forms part of inner circumferential surface 20a of ferrule 20. Of end portion 11c of optical fiber 11, a portion excluding distal end 11c1, that is, a portion covered with coating material 12 is inserted into through hole 22a. Flange 22 is made of a metallic material such as stainless steel.

Both of ferrule body 21 and flange 22 may be made of stainless steel. In this case, ferrule 20 has a structure in which ferrule body 21 and flange 22 are integrally formed with stainless steel.

In optical fiber module 2 according to the present embodiment, outer circumferential surface 11a of optical fiber 11 and inner circumferential surface 20a of ferrule 20 are bonded by silicone resin 30 containing siloxane bonds, rather than carbon-carbon bonds, at its cross-linking points.

Specifically, distal end 11c1 of end portion 11c of optical fiber 11 and through hole 21a of ferrule body 21 are bonded by silicone resin 30 above. Of end portion 11c of optical fiber 11, the portion excluding distal end itch and through hole 22a of flange 22 are bonded by silicone resin 30 above. In other words, an adhesive layer made of silicone resin 30 above is disposed between optical fiber 11 and ferrule 20. The thickness of the adhesive layer near the end surface is 10 μm or less, for example. This adhesive layer has an end surface connecting end surface 11b of optical fiber 11 to end surface 20b of ferrule 20 flush therewith.

By bonding optical fiber 11 to ferrule 20 by silicone resin 30 as described above, an increase in temperature and light emission can be suppressed even if silicone resin 30 located between optical fiber 11 and ferrule 20 is irradiated with laser light, because silicone resin 30 barely absorbs laser light. Because light emission of silicone resin 30 can be suppressed, a reduction in precision in detection of the presence/absence of disconnection of optical fiber 11 in lighting device 1 can be suppressed.

Moreover, the heat resistance and mechanical strength of silicone resin 30 can be enhanced because silicone resin 30 is made of a resin containing siloxane bonds at its cross-linking points and not having carbon-carbon bonds at its cross-linking point. According to this, strength in fixation of optical fiber 11 to ferrule 20 can be enhanced, and damage of end surface 11b can be suppressed, for example, when end surface 11b of optical fiber 11 is polished.

[3. Method of Manufacturing Optical Fiber Module]

Next, a method of manufacturing optical fiber module 2 will be described.

Figure 10:
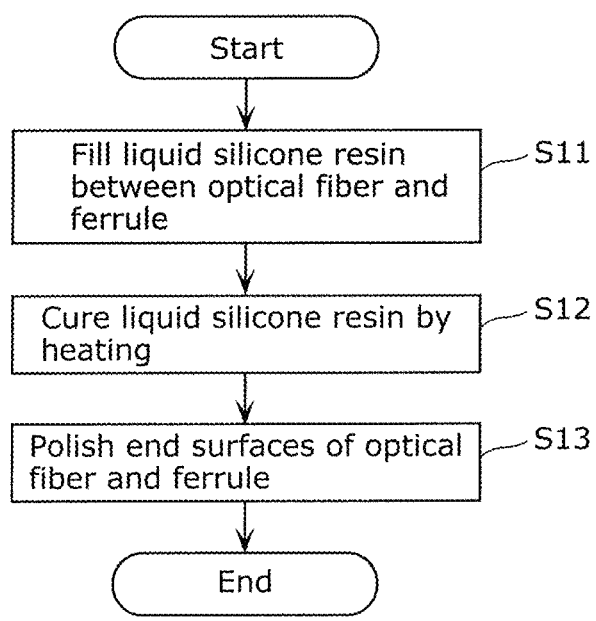
FIG. 10 is a flowchart illustrating a method of manufacturing an optical fiber module according to an embodiment.

FIG. 10 is a flowchart illustrating a method of manufacturing optical fiber module 2.

First, a liquid silicone resin having polymer carbons is filled between outer circumferential surface 11a of optical fiber 11 and inner circumferential surface 20a of ferrule 20 (step S11). The filling of the liquid silicone resin is implemented, for example, by applying the liquid silicone resin to at least one of outer circumferential surface 11a in end portion 11c of optical fiber 11 and inner circumferential surface 20a of ferrule 20, and then inserting end portion 11c of optical fiber 11 into inner circumferential surface 20a of ferrule 20. Alternatively, the filling is implemented by inserting end portion 11c of optical fiber 11 into inner circumferential surface 20a of ferrule 20, and then injecting a liquid silicone resin having appropriate viscosity between outer circumferential surface 11a in end portion 11c of optical fiber 11 and inner circumferential surface 20a of ferrule 20.

The polymer carbons represent an alkoxy group such as $CH_3CH_2OH$, and are present in the form of a reactive group in the liquid silicone resin before heat curing of the liquid silicone resin (see the structure of the raw material polymer in (b) in FIG. 5). Examples of the liquid silicone resin can include polysilsesquioxanes (SR series) made by Konishi Chemical Inc. Co., Ltd.

Next, the liquid silicone resin is heated at a temperature of 140° C. or higher to progress the cross-linking reaction, thereby curing the liquid silicone resin (step S12). The heating temperature is desirably 140° C. or more and 210° C. or less. By heating, the polymer carbon-derived product generated during the cross-linking reaction evaporates to be removed from the silicone resin. Thereby, the cross-linking points of silicone resin 30 by which optical fiber 11 and ferrule 20 are bonded are composed of only siloxane bonds, and the main chains (main chains excluding side chains) of silicone resin 30 have a structure without carbon-carbon bonds (see the product generated during the cross-linking reaction in (b) in FIG. 5). It is noted that silicone resin 30 is also called a condensation silicone resin. The condensation silicone resin is a resin polycondensed through a dealcoholization or dehydration reaction between a hydroxyl group bonded to a silicon atom and an alkoxy group or hydroxyl group bonded to another silicon atom. Although an example in which the liquid silicone resin is heated at a temperature of 140° C. or higher has been shown, a preparative heating step at a 140° C. or less may be included before main heating at 140° C. or higher to remove the solvent for the silicone resin.

Next, end surface 11b of optical fiber 11 and end surface 20b of ferrule 20 are polished simultaneously using a polisher (step S13). Thereby, a polished surface is formed where end surfaces 11b and 20b are flush with each other. Through these steps S11 to S13, optical fiber module 2 is manufactured.

As described above, by curing the liquid silicone resin by heating, optical fiber 11 and ferrule 20 can be bonded by silicone resin 30 which does not have carbon-carbon bonds in the main chains. Thereby, a reduction in strength in fixation of optical fiber 11 to ferrule 20 can be suppressed, and damage of end surface 11b of optical fiber 11 in polishing in step S13 can be suppressed.

[4. Effects]

Optical fiber module 2 according to the present embodiment includes optical fiber 11 containing a glass component, and ferrule 20 which is tubular in shape and covers outer circumferential surface 11a in end portion 11c of optical fiber 11. Outer circumferential surface 11a of optical fiber 11 and inner circumferential surface 20a of ferrule 20 are bonded by silicone resin 30 containing siloxane bonds at its cross-linking points.

By bonding optical fiber 11 to ferrule 20 by silicone resin 30 as described above, light emission of silicone resin 30 as an adhesive can be suppressed even if silicone resin 30 located between optical fiber 11 and ferrule 20 is irradiated with laser light, because silicone resin 30 barely absorbs laser light. Because silicone resin 30 barely absorbs laser light, an excessive increase beyond necessity in temperature of silicone resin 30 as an adhesive can be suppressed.

The heat resistance and mechanical strength of silicone resin 30 can be enhanced because silicone resin 30 is made of a resin containing siloxane bonds at its cross-linking points. According to this, strength in fixation of optical fiber 11 to ferrule 20 can be enhanced, and damage of end surface 11b can be suppressed, for example, when end surface 11b of optical fiber 11 is polished.

The cross-linking points of silicone resin 30 may be composed of only siloxane bonds.

According to this, strength in fixation of optical fiber 11 to ferrule 20 can be enhanced, and damage of end surface 11b can be suppressed, for example, when end surface 11b of optical fiber 11 is polished.

Moreover, silicone resin 30 does not need to contain carbon-carbon bonds at its cross-linking points.

According to this, strength in fixation of optical fiber 11 to ferrule 20 can be enhanced, and damage of end surface 11b can be suppressed, for example, when end surface 11b of optical fiber 11 is polished.

Moreover, optical fiber 11 and ferrule 20 may have end surfaces 11b and 20b flush with each other.

According to this, end portion 11c of optical fiber module 2 can be fixed using ferrule 20, and laser light can be more efficiently introduced from end surface 11b of optical fiber 11.

Lighting device 1 according to the present embodiment includes light source element 51 which outputs laser light, optical fiber module 2 into which laser light is introduced, and wavelength converter 60 which converts the laser light introduced by optical fiber module 2 into light having a different wavelength.

In lighting device 1 including optical fiber module 2 above, light emission of silicone resin 30 as an adhesive can be suppressed even if silicone resin 30 located between optical fiber 11 and ferrule 20 is irradiated with laser light, because silicone resin 30 barely absorbs laser light. Moreover, an excessive increase beyond necessity in temperature of silicone resin 30 as an adhesive can be suppressed because silicone resin 30 barely absorbs laser light.

Moreover, lighting device 1 may further include combining lens 54 which converges laser light to end surface 11b of optical fiber 11.

According to this, the quantity of laser light to be emitted to silicone resin 30 can be reduced because large part of laser light can be introduced into end surface 11b of optical fiber 11 using combining lens 54. Thereby, light emission of silicone resin 30 can be suppressed.

Moreover, lighting device 1 may further include optical feedback sensor 56 which detects light returning through optical fiber module 2 out of the light radiated by wavelength converter 60.

According to this, a reduction in precision in detection of the presence/absence of disconnection of optical fiber 11 in lighting device 1 can be suppressed even if silicone resin 30 located between optical fiber 11 and ferrule 20 is irradiated with laser light, because light emission of silicone resin 30 can be suppressed.

The laser light may have a wavelength of 430 nm or more and 490 nm or less.

Because lighting device 1 includes optical fiber module 2 where silicone resin 30 having transmissivity to laser light having a wavelength of 430 nm or more and 490 nm or less is used as an adhesive, light emission of silicone resin 30 can be suppressed even if silicone resin 30 is irradiated with the laser light.

The method of manufacturing optical fiber module 2 according to the present embodiment is a method of manufacturing optical fiber module 2 including optical fiber 11 containing a glass component and ferrule 20 which is tubular in shape and covers outer circumferential surface 11a in end portion 11c of optical fiber 11, the method including filling a liquid silicone resin having polymer carbons between outer circumferential surface 11a of optical fiber 11 and inner circumferential surface 20a of ferrule 20; curing the liquid silicone resin by heating at a temperature of 140° C. or higher; and polishing end surface 11b of optical fiber 11 and end surface 20b of ferrule 20 simultaneously.

By curing the liquid silicone resin by heating as described above, optical fiber 11 and ferrule 20 can be fixed by silicone resin 30 not having carbon-carbon bonds in the main chains. Thereby, a reduction in strength in fixation of optical fiber 11 to ferrule 20 can be suppressed, and damage of end surface 11b of optical fiber 11 during polishing can be suppressed.

[Other Embodiments]

Although the optical fiber module according to the present disclosure has been described as above based on the embodiments, the present disclosure should not be limited to these embodiments.

For example, although an example in which the liquid silicone resin contains polymer carbons has been shown in the above description, the liquid silicone resin is not limited thereto. The liquid silicone resin may be a liquid silicone resin having a hydroxyl group instead of polymer carbons.

Although a situation where the presence/absence of disconnection of optical fiber 11 is determined when light source element 51 outputs laser light as excitation light has been described as above, the determination of the presence/absence of disconnection should not be limited to such a situation. For example, lighting device 1 may determine the presence/absence of disconnection of optical fiber 11 by, on trial, outputting light having a lower light intensity and having a broader spectrum width than those of excitation light before light source element 51 outputs the excitation light, and detecting whether this light normally returns. According to the present embodiment, light emission of the adhesive can also be suppressed even in such a situation where the light is output on trial.

Besides, embodiments obtained by performing a variety of modifications on the embodiments conceived by persons skilled in the art, and those implemented by arbitrarily combining the components and functions of the embodiments without departing the gist of the present disclosure are also included in the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An optical fiber module, comprising:
an optical fiber containing a glass component; and
a ferrule which is tubular in shape and covers an outer circumferential surface in an end portion of the optical fiber,
wherein the outer circumferential surface of the optical fiber and an inner circumferential surface of the ferrule are bonded by a silicone resin containing siloxane bonds at cross-linking points.

2. The optical fiber module according to claim 1, wherein the cross-linking points of the silicone resin are composed of only the siloxane bonds.

3. The optical fiber module according to claim 1, wherein the silicone resin contains no carbon-carbon bond in main chains.

4. The optical fiber module according to claim 1, wherein the optical fiber and the ferrule have end surfaces flush with each other.

5. A lighting device, comprising:
a light source element which outputs laser light;
the optical fiber module according to claim 1 into which the laser light is introduced; and
a wavelength converter which converts the laser light guided by the optical fiber module into light having a different wavelength.

6. The lighting device according to claim 5, further comprising:
a combining lens which converges the laser light to an end surface of the optical fiber.

7. The lighting device according to claim 5, further comprising:
an optical feedback sensor which detects light returning through the optical fiber module out of the light radiated by the wavelength converter.

8. The lighting device according to claim 5, wherein the laser light has a wavelength of 430 nm or more and 490 nm or less.

9. A method of manufacturing an optical fiber module including an optical fiber containing a glass component, and a ferrule which is tubular in shape and covers an outer circumferential surface in an end portion of the optical fiber, the method comprising:
filling a liquid silicone resin having polymer carbons between the outer circumferential surface of the optical fiber and an inner circumferential surface of the ferrule;
curing the liquid silicone resin by heating at a temperature of 140° C. or higher; and
polishing an end surface of the optical fiber and an end surface of the ferrule simultaneously.

* * * * *